United States Patent Office 3,348,714
Patented Oct. 24, 1967

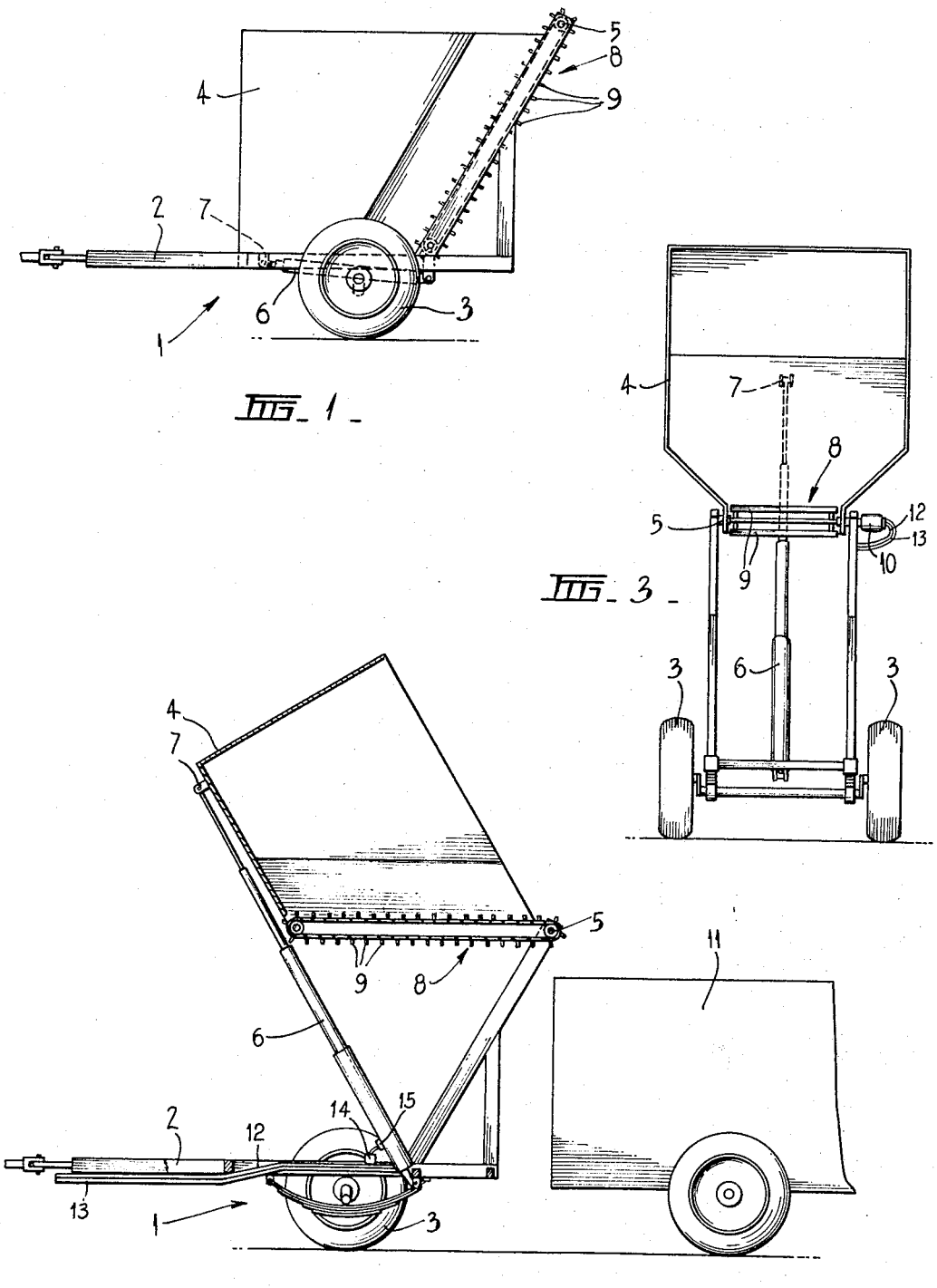

3,348,714
TIPPING-BIN TRUCKS OR TRAILERS
Roy Cecil Ash, Geelong, Victoria, Australia, assignor to International Harvester Company, Chicago, Ill., a corporation of Delaware
Filed Oct. 6, 1965, Ser. No. 493,511
3 Claims. (Cl. 214—508)

ABSTRACT OF THE DISCLOSURE

A tipping bin that pivots about an axis proximate its upper edge having a wall adjacent the axis including a conveyor that functions as a discharging floor when the bin is in the raised position. The means for effecting tipping of the bin and driving of the conveyor being interconnected such that there is a timed relationship in their operation.

---

This invention relates to a tipping-bin truck or trailer hereinafter referred to as a "tipping bin" particularly adapted for the transportation and depositing of materials which do not discharge from a bin or like receptacle readily unless the surface on which said pieces rest is inclined to the horizontal to a substantial degree.

Materials to which the tipping bin of the invention applies are of the nature of billets or blocks of wood, briquettes, cotton buds and especially lengths of chopped cane harvested in the field.

For convenience and practicability but without limitation the invention will be described with reference to its application to chopped cane.

It is the present conventional practice in handling chopped cane from harvesters to elevate the chopped cane directly from a harvester into a bin of 3 to 4 ton capacity, either towed behind, or drawn alongside the harvester by a tractor or motor truck, the bin when filled is then transported to the mill for processing on rail tracks laid in the field. The wheels fitted to the presently used bin of the conventional rail rolling stock type and are therefore not suitable for travelling across the cane fields behind or beside the harvester. Accordingly the bins are carried on a pneumatic typred trailer whilst in the cane field.

Considerable time is lost in loading and unloading of tipping bins on to pneumatic tyred trailers and during this time the harvester cannot operate. The time lost can be substantial when it is realised that frequently the crop is of a density that requires the bin to be changed approximately every 10 minutes.

It is the principal objective of the present invention to provide a tipping bin which will increase the efficiency of transportation of chopped cane from the harvester to the mill, and reduce the idle time of the harvester during bin changes.

In achieving the above stated principal objective it must be borne in mind that the bins used are relatively large and because of the nature of the ground on cane fields are usually mounted on large diameter wheels so that tipping must be carried out at a high level.

In accordance with the present invention there is provided a tipping bin comprising a wheeled frame, an open topped bin mounted on said frame for angular movement about an axis at or near the upper extremity of one side of the bin when in a loading position, said side comprising a conveyor, and means for effecting angular movement of the bin about said axis to a tipping position in which said side is the lowermost side of the bin.

Conveniently the wheeled frame is adapted to be drawn by a harvester or tractor during the harvesting operation and the side of the bin comprising the conveyor is the rearmost side i.e. that side remote from the harvester or tractor.

Any suitable power mechanism may be employed to actuate the movements of the bin such as a hydraulic ram pivotally connected to the frame near the lower edge of the bin nearest to the position about which the bin pivots, and the bottom edge of the bin remote from said pivotal axis.

The conveyor is of the slat type and may be driven by a hydraulic motor. The operation of the conveyor is initiated by a manually operated control, however, when the tilting of the bin has been completed or at some intermediate point during tilting, the operation of the conveyor may be initiated automatically.

The ram for tilting the bin may be mounted centrally and longitudinally beneath the tipping bin or alternatively two such rams may be mounted one on each side of the bin.

The provision of the conveyor to form the lowermost side of the bin in the tipping position enables the bin to be pivoted about an axis located sufficiently high to discharge the bin contents into a high sided truck for transport to the mill, but reduce the amount of movement necessary to effect complete discharge.

Thus the bin contents can be discharged quickly into another bin on a truck without causing a long delay in the harvesting operation.

The invention will now be exemplified by describing one practical arrangement with reference to the accompanying drawings in which:

FIGURE 1 is a side view of the apparatus with the bin in the loading position;

FIGURE 2 shows the bin in the tipped or discharging position; and

FIGURE 3 is an end view of FIGURE 2.

In the arrangement shown the tipping trailer 1 is arranged for attachment to a harvester and comprises the frame 2 mounted on the pair of wheels 3 and the bin 4 pivotally mounted at 5, the uppermost end of the rear of the bin to the frame 2.

The telescopic hydraulic ram 6 is pivotally connected at 12 to the frame 2 and extends forwardly therefrom beneath the bin and is attached to the bracket 7 secured to the bin at or about its lower forward edge, remote from the pivoting edge.

The rear end wall 8 of the bin adjacent and parallel to the pivoting axis of the bin is formed by the operated slat conveyor 9, driven by the hydraulic motor shown diagrammatically at 10. Both the hydraulic ram and the motor of the slat conveyor are connected by means of flexible hoses to a source of hydraulic power mounted on and operated from an associated harvester which also serves as the prime mover for the tipping trailer. The tipping trailer is connected in any conventional and desired manner to the harvester.

The manner of operation of the tipping trailer described in this practical arrangement is as follows:

As the harvester proceeds through the field the cane is harvested and chopped up and passed, by means of an elevator mounted on the harvester, to discharge into the trailing bin. When the bin has been filled to the desired level a truck 11 is brought up to the rear end of the trailing bin as shown in FIGURE 2, and the bin elevated by means of the hydraulic ram to discharge the load into the truck. When the bin has been elevated to its limit, or some little time before, the slat conveyor which now constitutes the floor of the bin is brought into operation and ensures that the whole load carried in the bin is discharged into the waiting truck.

The hydraulic ram 6 and the hydraulic motor 10 can be supplied with fluid from a conduit 12 having a discharge port 14 that is connected by a flexible hose to the input port 15 of hydraulic ram 6. The conduit 12 extends upwardly from this discharge port 14 through the inclined post to the hydraulic motor 10. As can be best seen in FIGURES 2 and 3 a conduit 13 arranged parallel to conduit 12 is provided to return the fluid from hydraulic motor 10 to its source. In this system the hydraulic ram 6 would expand in response to a pressure less than the pressure required to operate conveyor 9 and would thus be actuated first. When the ram 6 is fully extended, hydraulic pressure would then increase sufficiently to actuate the conveyor 9.

It will be evident that considerable time and labour is saved in this operation and that the load of chopped cane is discharged from the bin without the need for manual handling of the load.

The embodiments of the invention for which an exclusive property or privilege is claimed are defined as follows:

1. A tipping bin comprising a wheeled frame, an open-topped bin having a floor and four closed sides pivotally mounted on said frame for angular movement about an axis proximate the upper extremity of one side of said bin, said one side comprising a conveyor means arranged such that said conveyor means forms an end wall of said bin when said bin is in a lowered loading position and a movable discharging floor when said bin is in a raised tilted position, means for effecting angular movement of said bin about said axis to a raised tilting position whereby said conveyor means is the lowermost side of said bin, means for actuating said conveyor means, and wherein the means for actuating the conveyor means and the means for effecting angular movement of the bin are interconnected so that the conveyor operates in timed relation with the raising and lowering of the bin.

2. A tipping bin according to claim 1, in which the conveyor is of the endless belt, slatted type.

3. A tipping bin according to claim 1, wherein the bin is tipped about said axis by a telescopic hydraulic ram attached pivotally to the frame and to the bottom of the bin.

References Cited

UNITED STATES PATENTS 2,850,052  9/1958  Solie _____ 214—508 XR

FOREIGN PATENTS 911,015  11/1962  Great Britain.

GERALD M. FORLENZA, *Primary Examiner.*

ALBERT J. MAKAY, *Examiner.*